United States Patent

King

[11] Patent Number: 5,891,590
[45] Date of Patent: Apr. 6, 1999

[54] BATTERY RECONDITIONING DEVICE

[76] Inventor: Thomas J. King, 2021 Selwyn Shores Dr., RR#3 Lakefield, Ontario, Canada, K0L 2H0

[21] Appl. No.: 954,365

[22] Filed: Oct. 20, 1997

[51] Int. Cl.[6] .................................................. H01M 10/42
[52] U.S. Cl. ............................... 429/49; 429/90; 320/139
[58] Field of Search ..................................... 429/7, 9, 3, 1, 429/48, 49, 50, 61, 90, 91, 92, 93; 320/139–141

[56] References Cited

U.S. PATENT DOCUMENTS

| 4,735,870 | 4/1988 | Rowlette | 429/7 |
|---|---|---|---|
| 4,871,959 | 10/1989 | Gali . | |
| 5,063,341 | 11/1991 | Gali . | |
| 5,180,641 | 1/1993 | Burns et al. | 429/1 |
| 5,276,393 | 1/1994 | Gali . | |
| 5,411,816 | 5/1995 | Patino | 429/7 |
| 5,491,399 | 2/1996 | Gregory . | |
| 5,569,550 | 10/1996 | Garrett et al. | 429/7 |
| 5,569,554 | 10/1996 | Tseufer | 429/9 |

FOREIGN PATENT DOCUMENTS

| WO 94/02981 | 2/1994 | WIPO . |
|---|---|---|
| Wo 96/17426 | 6/1996 | WIPO . |

*Primary Examiner*—Anthony Skapars
*Attorney, Agent, or Firm*—Richard J. Hicks

[57] ABSTRACT

A device and method for reducing crystal formations, which have a range of resonant frequencies, on electrode plates of an electrical battery, is described. A signal generator is connected to the primary winding of a transformer, having primary and secondary windings, so as to deliver a transformed alternating current signal to the secondary winding. A rectifier is connected to the secondary winding to convert the transformed signal to a train of direct current pulses at a frequency within the range of resonant frequencies, and an output circuit is connected to the rectifier to deliver the train of pulses to the battery causing the crystals to crack and redissolve into the battery solution. There is also a provision for adjusting the frequency of the alternating current signal.

19 Claims, 3 Drawing Sheets

BATTERY RECONDITIONING DEVICE

BACKGROUND OF THE INVENTION

1. Field of the Invention

The present invention relates to the reconditioning of batteries.

2. Description of the Related Art

It is known that when a lead acid battery discharges or remains inactive, lead sulfate forms on the battery's plates. The lead sulfate gradually accumulates, clogging the plates to the point where the battery is no longer usable. The phenomenon of this sulfate crystal growth has been documented and will not be discussed further.

Several devices are currently available to recondition lead acid batteries by delivering a pulse at a given frequency to the battery terminals. Although satisfactory, the conventional devices are generally based on the principle of a DC pulse waveform and, as such, are unable to be adjusted according to certain variations both in the types of batteries being reconditioned and the changes in the capacity of the battery itself during the procedure.

It is an object of the present invention to obviate these problems.

SUMMARY OF THE INVENTION

Briefly stated, the invention involves a device for reducing crystal formations from on electrode plates of a lead acid battery, the crystals having a range of resonant frequencies, the device comprising:

a transformer having a primary winding and a secondary winding;

signal generating means coupled with the primary winding for delivering an alternating current signal to the primary winding, so as to generate a transformed alternating current signal on the secondary winding;

rectifier means joined to the secondary winding for converting the transformed alternating current signal to a train of direct current pulses at a frequency within the range of resonant frequencies of the crystals;

output circuit means connected to coupled with the rectifier means for delivering the train of pulses, to the battery; and frequency adjustment means for adjusting the frequency of said alternating current signal.

In another aspect of the present invention, there is provided a device for reducing crystal formations on electrode plates of an electrical battery, the crystals having a range of resonant frequencies, the device comprising:

a transformer having a primary winding and a secondary winding;

signal generating means coupled with the primary winding for delivering an alternating current signal to the primary winding, so as to generate a transformed alternating current signal on the secondary winding;

rectifier means connected to the secondary winding for converting the transformed alternating current signal to a train of direct current pulses at a frequency within the range of resonant frequencies of the crystals;

output circuit means connected with the rectifier means for delivering the train of pulses to the battery; and condition indicator means for indicating the condition of the battery.

In still another aspect of the present invention, there is provided a technique for reducing crystal formations on electrode plates of a lead acid battery, the crystals having a range of resonant frequencies, the device comprising:

providing a transformer having a primary winding and a secondary winding;

generating an alternating current waveform on the winding, so as to generate a transformed waveform on the secondary winding;

rectifying the transformed waveform to form a direct current rectified waveform;

delivering the rectified waveform to the battery; and adjusting the frequency of the alternating current waveform according to the condition of the battery.

In still another aspect of the present invention, there is provided a technique for reducing crystal formations on electrode plates of a lead acid battery, the crystals having a range of resonant frequencies, the device comprising:

providing a transformer having a primary winding and a secondary winding;

generating an alternating current waveform on the primary winding, so as to generate a transformed waveform on the secondary winding;

adjusting the frequency of the waveform to fall within the range;

rectifying the transformed waveform to form a direct current rectified waveform; and delivering the rectified waveform to the battery.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
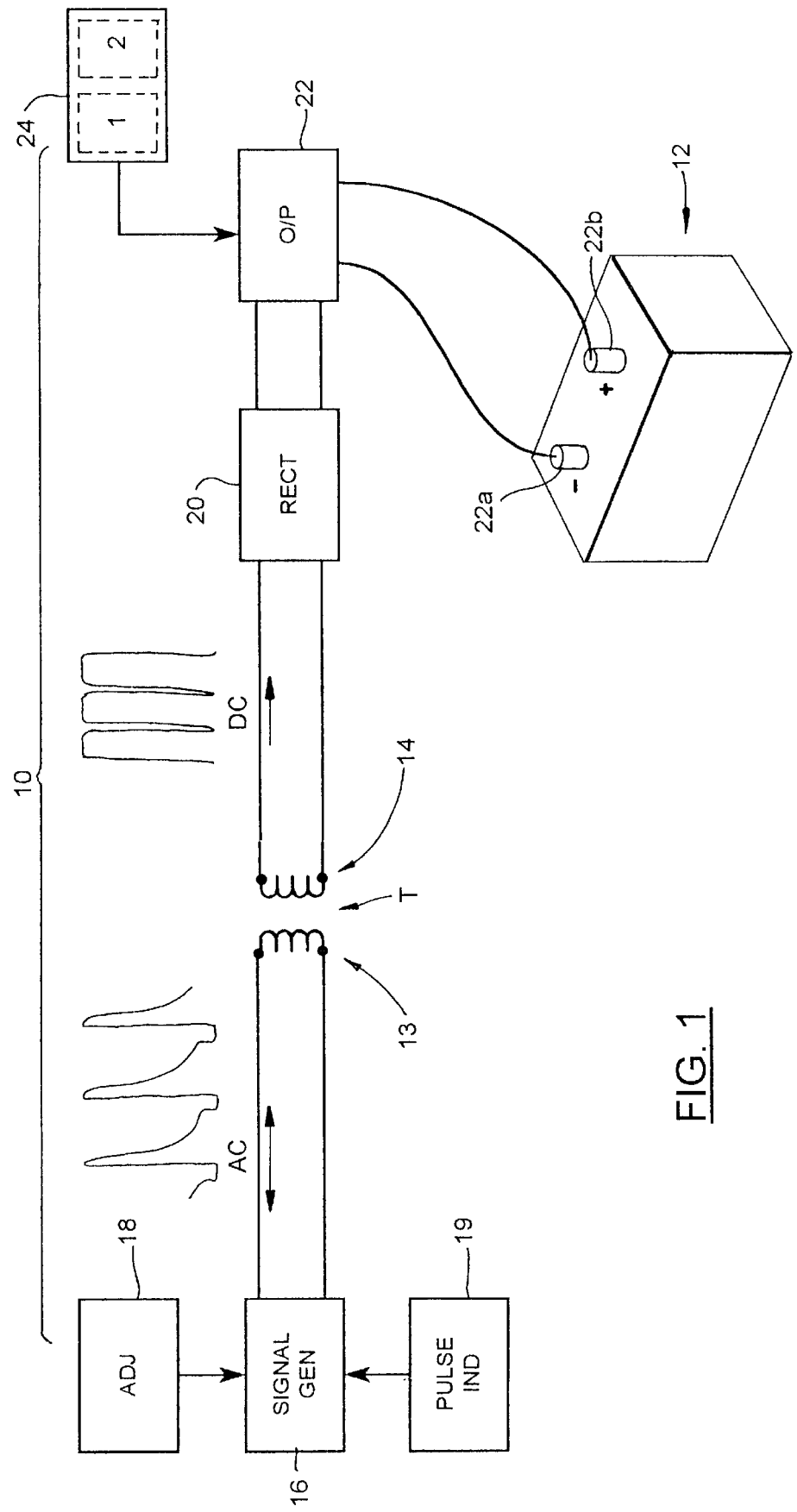
FIG. 1 is a schematic diagram of a device for reducing crystal formations on electrode plates of a lead acid battery.

Referring to FIG. 1, there is provided a device 10 for reducing crystal formations on electrode plates of a lead acid battery such as that shown at 12. The device has a transformer 'T' having a primary winding 13 and a secondary winding 14. Signal generating means 16 is coupled with the primary for delivering an alternating current (AC) signal to the primary, the alternating current signal having a selected frequency and a selected amplitude, thereby to generate a transformed alternating current signal on the secondary. Provided with the generating means is a frequency adjustment means 18 for adjusting the frequency and an indication means 19 for indicating the presence of the alternating current waveform on the primary.

Connected to the secondary windingly is a rectifier means 20 for converting the transformed alternating current signal to a train of, direct current (DC) pulses at a frequency within the range of resonant frequencies of the crystals.

Output circuit means 22 is coupled with the rectifier means 20 for delivering the train of pulses to the battery by way of battery terminals 22a, 22b and further includes condition indicator means 24 for indicating the condition of the battery. More particularly, the condition indicator means 24 provides for means to indicate at least two operational thresholds in the battery, as shown by blocks '1' and '2'.

Figure 2:
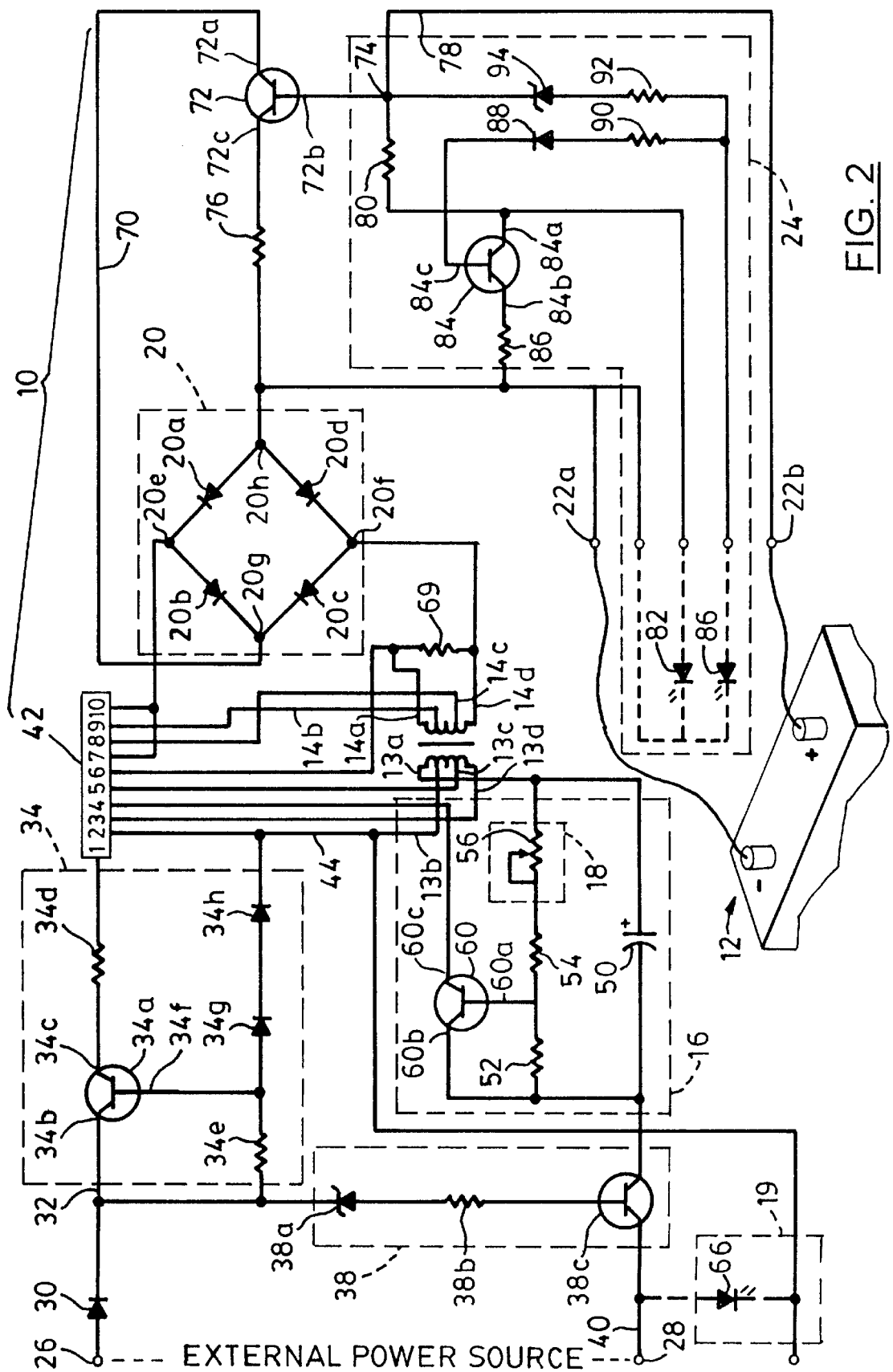
FIG. 2 is a detailed schematic view of a principal component of the device of FIG. 1.

Looking more specifically at the components of the device as shown in FIG. 2, the device has a pair of power supply terminals, namely positive and negative terminals 26, 28 to deliver a supply of operating power to the device. The device can be used either with an external power source applied to the terminals 26, 28 or alternatively with the terminals 22b, 26 and 22a, 28 hard-wired so that the battery supplies power to the device, as will be described below. Adjacent the positive terminal 26 is a diode 30, which serves simply to protect the device from an incorrectly biased power supply. The power is split between a conductive path 32 entering a current limiting circuit 34 and a conductive path 36 having thereon a switch circuit 38, the latter of which includes a zener diode 38a in series with a resistor 38b, both in series with a base of a transistor 38c. The collector and emitter of the transistor 38c are located in a return conductive path 40 connected to the negative terminal.

The current limiting circuit 34 includes a transistor 34a whose collector 34b and emitter 34c are in series with a resistor 34d as well as the jumper 1 of a junction shown at 42. A resistor 34e is connected between the conductive path 36 and the base 34f of the transistor 34a and a pair of diodes 34g, 34h located in series, to a conductive path 44 joined at one end to jumper 2 and at another end to a tap of the primary 13 shown as 13b.

The transformer T has a primary winding with a plurality of taps. The transformer is provided with a predetermined number of windings between the individual taps. For the sake of order, the taps of the primary have been numbered 13a to 13d starting from the top as viewed in FIG. 2 while the taps of the secondary winding have similarly been numbered 14a to 14d. It will be understood by those skilled in the art, that the waveform appearing on a particular tap will depend on its position relative to those taps which have been selected, with a predetermined windings ratio therebetweeen, to generate a corresponding AC waveform on the secondary winding.

The frequency generating means 16 has a capacitor 50 which is connected between tap 13a of the primary 13 and negative terminal 28 and which is arranged in parallel with a resistor means, in the form of a first resistor arrangement, in this case a single resistor 52, and a second resistor arrangement made up of a resistor 54 and adjustable resistor (also known as a potentiometer) 56 which serves as the adjustment means 18 for adjusting the predetermined frequency of the primary as will be described. Positioned between the resistors 54 and 56 is the base 60a of a transistor 60. The emitter 60b of the transistor 60 is connected to the other end of the capacitor 50 and the resistor 52 while the collector 60c is connected to a junction 4 on the jumper 42.

The transistor 60 serves as a switch means and is operable alternatively to charge and to discharge the capacitor 50 through the primary winding, thereby to form the alternating current signal.

Tap 13d of the primary is connected to a junction 3 while tap 13c is connected to junction 5 and are provided so that the device can be adjusted to deliver a predetermined level of voltage to the battery in the manner to be described and depending on the selection of junctions 3 and 5 with junction 4.

The base 60a of the transistor 60 is operable to switch on the transistor at a selected minimum voltage level appearing thereon. The adjustable resistor 56 serves as a frequency adjustment means for varying the rate of change of the voltage level on the base. This is achieved by the fact that the base 60a is located between the resistor 52 and the resistors 54, 56, so that a change in the resistance in the resistor 56 will cause a corresponding change in the voltage appearing on the base 60a at any particular time.

The frequency is selected to fall within a range of frequencies that is believed to correspond to the range of resonant frequencies of the lead sulfate crystals. Preferably, the range is in the order of about 10 Khz to 32 Khz and more preferably in a range of about 20 Khz to 32 Khz.

The tap 13b is selected in such a manner that the waveform thereon will reflect the alternating current waveform generated in the primary. It is at this tap that the indication means 19 is connected and is in the form of a light emitting diode (LED) 66, for indicating the presence of a negative voltage level in the primary.

Referring briefly to the secondary winding of the device as shown in FIG. 2, taps 14a, 14b and 14c are connected to jumpers 6, 9 and 8. The rectifier means 20 is provided in the form of a four diode rectifier bridge having four diodes shown at 20a to 20d with a node 20e joined to the jumper 7. In this manner, jumper 7 is connected to either 6, 8 or 9 depending, again, on the voltage needs in the battery as will be described.

The rectifier bridge has a node 20f which is connected to a tap 14d in the secondary 14, which is in turn joined to tap 14a through a resistor 69. The rectifier bridge has another node 20g is connected to a conductive path shown at 70 leading to the positive terminal 22b of the output circuit 22 and a node 20h which is coupled to the negative terminal 22a of the output circuit 22.

The conductive path 70 is connected to an emitter 72a of a transistor 72 whose base 72b is connected to a junction 74 and whose collector is connected to a resistor which in turn is connected to the node 20h of the rectifier 20.

Connected to the junction 74 is the positive terminal 22b by way of conductive path 78 as well as the condition indicator means 24. The condition indicator means includes a resistor 80 which is connected at one end of the junction 74 and is in series with an LED 82. Located between the resistor 80 and the LED 82 is the collector 84a of a transistor 84, whose emitter 84b is connected to the negative terminal 22a through a series connection with a resistor 86. The base 84c is connected to another LED 86 thorough a series connection with the cathode of diode 88 and a resistor 90. Also connected with LED 86 is a resistor 92 joined to the anode of a zener diode 94, whose cathode is connected to the junction 74. The LED 82 serves as a sensing means for sensing the presence of the residual battery power, while the LED 36 and its associated resistor 92 and zener diode serve as one aspect of a switch means to close the conductive path to the LED 82 and to open the conductive path to LED 84, when the transformed waveform has a voltage that exceeds a predetermined voltage level in the battery, while the transistor 84 serves as another aspect of the switch means to inhibit the supply of residual battery power to the LED 82. In other words, the zener diode 94 is a limit means for inhibiting the power supply to LED 86 and to the base of transistor 84 when the voltage appearing at junction 74 is below the predetermined voltage level.

For the sake of illustration, the LED's 82, 86 are shown as being separate discrete LED's but are preferably two portions of a bi-colour LED. However, two discrete LED's may be used if desired.

In order to ready the device for operation, it is first set for the particular battery to be charged. Depending on the turns ratio in the transformer and other associated components, the device might be configured, for example, by connecting jumpers 1 to 2, 3 to 4 and 6 to 7.

To operate the device 10, a battery 12 is first connected to the terminals 22a, 22b of the output circuit. If the battery has some residual charge, the power from the battery is directed to the junction 74 and through resistor 80 to the LED 82. The operator then looks for the presence of a visible, for example RED, signal being emitted by the LED 82 to indicate the presence of power passing through the LED. If in fact the battery does not have even enough residual power to operate the LED 82, the operator may conclude that the battery is beyond reconditioning and simply discard the battery. If the operator has inadvertently connected the positive terminal 22b with the negative terminal of the battery, the now negative voltage appears at junction 74 and thus at base 72b of transistor 72, causing the emitter-collector junction therein to be opened, so as to, in effect, isolate the components of the device from damage as result of inadvertent reversed polarity at the battery terminals.

The device 10 is then calibrated by first delivering power to the power supply terminals 26, 28, with the proper polarity, so that the power flows through diode 30 and into conductive path 32. The level of power appearing at the terminals 26, 28 is selected so as to exceed the threshold voltage of zener diode 38a and the potential drop over the resistor 38b, so as to saturate the base of transistor 38, causing the return conductive path 40 to be closed, thereby establishing current flow through the primary winding.

The power then is directed to the capacitor which accumulates charge, thereby increasing the potential appearing across resistors 52, 54 and 56. The voltage drop across the capacitor will increase in value until the voltage on the base 60a will saturate the base causing the emitter-collector junction in transistor 60 to close. By the above mentioned connections at the jumper junction, the collector is effectively joined to the positive side of the capacitor while the emitter 60b is effectively at ground, causing a sudden discharge of the capacitor 50 causing a sudden current pulse through the primary winding, and a corresponding loss in potential across the resistors 52, 54, 56 until the voltage at the base 60a falls below the threshold valve thereof. This causes the emitter-collector junction of transistor 60 to open, thereby causing the capacitor, once again, to accumulate charge.

If the resistance of adjustable resistor 56 is set at a relatively low value, the voltage appearing at resistor 52, and therefore at base 60a is a relatively large proportion of the power appearing at the capacitor. Conversely, if the resistance of adjustable resistor 56 is set at a relatively high value, the voltage appearing at resistor 52, and therefore at base 60a is a relatively small proportion of the power appearing at the capacitor.

It follows that in the case where the resistor 56 is set with a relatively low value, the base will reach a threshold value sooner in the charging process of the capacitor than if the resistor is set at a relatively high value. Therefore, the adjustability of the resistor 56 provides an ability to adjust the frequency at which the transistor 60 closes its emitter-collector junction, and therefore the frequency of the current pulses being passed through the primary winding.

Figure 3A:
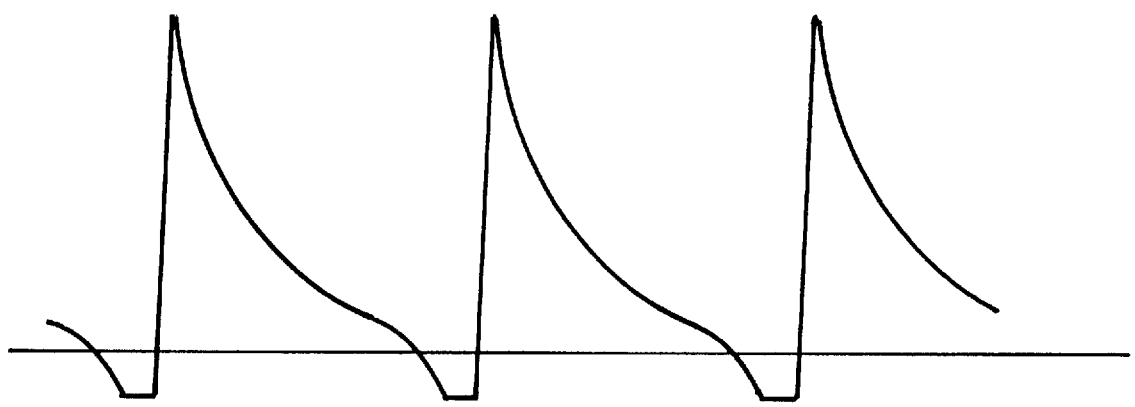
FIGS. 3a and 3b are schematic views showing successive waveforms generated by the device of FIG. 1.
Figure 3B:
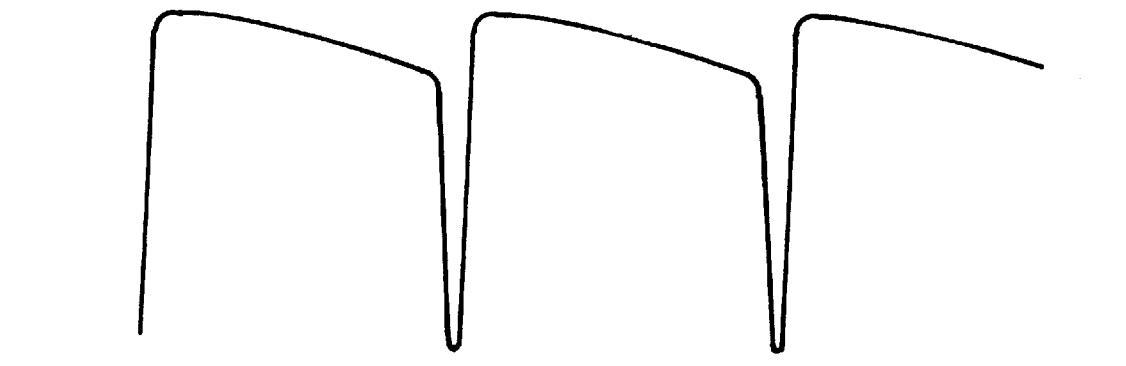

Furthermore, because of the arrangement of the transformer windings and taps, a current pulse causes a momentary reverse in the bias, of the current pulse in the primary, that is the voltage in the primary has a momentary negative amplitude, thereby causing the alternating current signal in the primary, as seen by the wave form in FIG. 3a. When this momentary reverse in the bias of the current pulse occurs, the voltage on the cathode of LED 66 is now relatively lower than the voltage on its anode, causing current to pass momentarily through the LED 66, thereby causing a visible signal or 'blink'. Thus, during the normal operation of the primary winding, the LED 66 will blink repeatedly indicating that the 'pulsing' action of the primary circuit is operating properly.

The alternating current signal in the primary winding is thus transformed onto the secondary winding according to the turns ratio therein and the transformed alternating current is passed through the rectifier bridge, causing the alternating waveform as shown in FIG. 3a to become a direct current pulse which is then directed to the collector of transistor 72, causing a corresponding voltage drop between the junction 74 and the node 20h of the rectifier bridge and thus a corresponding voltage drop between the negative and positive terminals 22a, 22b, thereby to recondition the battery.

As the direct current waveform is received by the battery, the sulfate crystals begin to crack and soften, thereby to be redissolved into the battery solution over time, causing a corresponding increase in the battery's ability to accept a charge. In a manner similar to that of a capacitor, the battery slowly accumulates power causing the voltage at the battery terminals to increase.

This has the effect of creating an increased load in the secondary winding and therefore in the primary winding of the transformer, having the effect increasing the load on the primary side of the transformer. This has the corresponding effect of lowering the potential across the resistors 52, 54 and 56 and therefore the potential at the base 60c. This in turn lowers the rate at which the transistor opens and closes the emitter-collector junction therein. As a result, the primary has an inherent tendency to adjust the frequency of the alternating current waveform therein according to the progressively changing conditions in the battery as its ability to accept a charge increases, that is as the sulfate crystal growth is progressively removed from the battery plates. In other words, the device has the capability to adjust itself automatically as the potential of the battery increases. In this case, a badly sulfated battery will produce a much higher frequency than one that has been de-sulfated and whose voltage potential is higher, causing the increased load on the primary.

In addition, as the voltage drop across the battery terminals increases, so does the voltage at the junction 74 until such time as the voltage exceeds the threshold voltage of zener diode 94. This particular threshold is selected so that it is exceeded when the battery's voltage corresponds to a predetermined point in its reconditioning process, which can be, for example, a point at the voltage across the battery increases by 5 percent, or some other number, indicating that the sulfating process is well under way. When this occurs, the power now passing through the zener diode 94 passes through resistors 92, 90 and diode 88 and saturates the base 84c causing the transistor 84 to open its emitter-collector junction, thereby effectively clamping the LED 82 to ground and to cut off further RED visible signalling. Meanwhile, the LED 86 is now generating a visible, for example GREEN, signal as a result of the voltage at the junction of resistors 90 and 92. In this manner, the LED 86 visibly indicates that the sulfating process is well under way, as mentioned above.

Thus, the present invention provides a voltage power source to effectively reclaim and maintain lead acid batteries and significantly extends the useful service life and reliability of batteries at reasonable cost.

As mentioned above, the device can be incorporated into the electrical system, such as in a vehicle, in which the battery is a component, by joining the positive terminals 22b, 26 with the negative terminals 22a 28, in effect allowing the battery being reconditioned to be the power source for the device, in addition to external generating systems within the electrical system. In this case, the device 10 serves to reduce the risk of overheating and distortion of the battery plates and to reduce the risk of internal shorting of the battery plates which, of course, would otherwise shorten the useful operating life of the battery. In this case, the device is automatically turned off and no pulsing action occurs when the electrical system is not in an active battery charging mode and therefore is not draining the existing battery potential.

The device also has the effect of lowering hydrogen gas emissions from heavily sulfated batteries which, without such controls, produce not only significant quantities of noxious fumes but also risk of explosion from an adjacent ignition source.

The bi-colour LED arrangement 82, 86 also provides an indication of battery sulfation and thus provides the operator with a means to determine the condition of the battery as is particularly useful for the sealed type battery which prevents the conventional method of measuring specific gravity with a hydrometer.

It is believed that, as a result, the electrical components downstream from the battery, maintained by the device 10, should last longer for the following reason. Electrical components are designed to operate at maximum performance with optimum battery power. If that battery is heavily sulfated one of two things could happen:

A. the voltage supplied is low, causing the component to draw more current thereby increasing the risk of overheating, or worse, burn-out;

B. the battery is heavily sulfated, thereby not able to absorb full current flow from the electrical system alternator resulting in high voltage spikes which also result in burn-out and failure of components.

The use of the device should reduce the number of batteries being discarded, reducing the amount of lead being deposited into landfill areas, saving battery casings being scrapped and thereby reduce the requirement for the production of more plastic battery cases. The device may be arranged to operate with a range of AC/DC, solar, or wind driven power sources and can be configured for providing cleaner, more consistent power for UPS and back up power supplies.

The device should reduce the cost of operating electric powered lift trucks by reducing the amount of electricity required to recharge them.

In the case of automobile engines, the power required to complete the recharge process is approximately 6 percent of the available power supplied by the engine. If the battery has reduced sulfate levels, it would represent a considerable saving of engine power resulting in a large saving in the consumption of fuel which in turn will reduce carbon monoxide and dioxide emissions into the atmosphere in addition to the consequent cost savings.

With the advent of electric cars on the near horizon, hydrogen sulphide gas emissions from heavily sulfated batteries present additional environmental problems and the device should alleviate some of these problems.

During brown out situations, due to power interruption, backup battery systems will be essential. Batteries that are heavily sulfated will not retain adequate power and will fail after short periods of use.

The requirement to mine the current quantities of metals such as lead and antimony will be reduced as reconditioned batteries significantly increase their life span when operated in a desulfated condition.

The device is adaptable for lead acid, gel type, starved electrode and other types of sealed batteries and may be particularly suited to low gravity applications since the power requirements for its operation may be as low as 10 milliamps and yet provide significant increases in the charging capacity of the batteries as a result.

What is claimed is:

1. A device for reducing crystal formations on electrode plates of a lead acid battery, said crystals having a range of resonant frequencies, said device comprising:

a transformer having a primary winding and a secondary winding;

signal generating means connected to said primary winding for delivering an alternating current signal to said primary winding, at a selected frequency and a selected amplitude, so as to generate a transformed alternating current signal on said secondary winding;

rectifier means connected to said secondary winding for converting said transformed alternating current signal to a train of direct current pulses at a frequency within said range of resonant frequencies;

output circuit means connected to said rectifier means for delivering said train of direct current pulses to said battery; and frequency adjustment means for adjusting said frequency of said alternating current signal.

2. A device as defined in claim 1 wherein said signal generating means includes a capacitor means and switch means operable alternatively to charge and to discharge said capacitor means through said primary winding, so as to provide said alternating current signal.

3. A device as defined in claim 2 wherein said signal generating means further includes resistor means including a first resistor arrangement and a second resistor arrangement, said switch including a transistor element with a base operable to switch on said transistor at a selected minimum voltage level appearing thereon, wherein said frequency adjustment means includes means for varying the rate of change of the voltage level on said base.

4. A device as defined in claim 3, wherein said frequency adjustment means includes a variable resistor arrangement arranged in parallel with said capacitor.

5. A device as defined in claim 4 wherein said primary winding has a plurality of taps, a first of said taps being at a location with an alternating voltage level, further comprising indication means for indicating the presence of a negative voltage level in said primary, said indication means being coupled to said first tap.

6. A device as defined in claim 5 wherein said indication means is a diode element operatively coupled with said first tap.

7. A device as defined in claim 6 further comprising current limiting means coupled with said capacitor for limiting current being delivered thereto.

8. A device for reducing crystal formation on electrode plates of an electrical battery, said crystals having a range of resonant frequencies, said device comprising:

a transformer having a primary winding and a secondary winding;

signal generating means connected said primary winding for delivering an alternating current signal to said primary winding, so as to generate a transformed alternating current signal on said secondary winding;

rectifier means connected to said secondary winding for converting said transformed alternating current signal to a train of direct current pulses at a frequency within said range of resonant frequencies;

output circuit means connected to said rectifier means for delivering said train of pulses to said battery; and condition indicator means for indicating the condition of said battery.

9. A device as defined in claim 8 wherein said output circuit means further comprises a positive terminal portion and a negative terminal portion, a first conductive path connected between said positive and negative terminal portions to carry residual battery power therethrough, said condition indicator means includes a sensing means for sensing the presence of said residual battery power.

10. A device as defined in claim 9 wherein said sensing means is a diode element.

11. A device as defined in claim 10 further comprising switch means to close said first conductive path when said train of pulses exceeds a selected voltage level.

12. A device as defined in claim 11, wherein said switch means includes a transistor element with a base, further including a second conductive path coupled between said secondary and said base.

13. A device as defined in claim 12 further comprising a third conductive path, coupled with said secondary and said negative terminal and a diode element positioned in said third conductive path for sensing the presence of said pulses with a voltage beyond said selected voltage level.

14. A device as defined in claim 13 further comprising limit means for inhibiting said pulses through said second and third conductive paths below said selected voltage level.

15. A device as defined in claim 14 wherein said limit means is a zener diode element.

16. A method for reducing crystal formations on electrode plates of a lead acid battery, said crystals having a range of resonant frequencies, said method comprising:

providing a transformer having a primary winding and a secondary winding;

generating an alternating current waveform on said primary winding, so as to generate a transformed waveform on said secondary winding;

adjusting the frequency of the waveform to fall within said range of resonant frequencies;

rectifying said transformed waveform to form a direct current rectified waveform; and delivering said rectified waveform to said battery.

17. A device as claimed in claim 1 wherein the resonant frequencies of said crystals are in the range of about 10 Khz to 32 Khz.

18. A device as claimed in claim 8 wherein the resonant frequencies of said crystals are in the range of about 10 Khz to 32 Khz.

19. A method as claimed in claim 16 wherein the resonant frequencies of said crystals are in the range of about 10 Khz to 32 khz.

* * * * *